(12) United States Patent
DeSantis et al.

(10) Patent No.: US 6,728,540 B1
(45) Date of Patent: Apr. 27, 2004

(54) ASSISTED HANDOVER IN A WIRELESS COMMUNICATION SYSTEM

(75) Inventors: Charles M. DeSantis, Neptune, NJ (US); Raymond A. Sackett, Rumson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/037,302

(22) Filed: Mar. 9, 1998

(51) Int. Cl.[7] ................................................. H04Q 7/20
(52) U.S. Cl. ....................... 455/437; 455/436
(58) Field of Search ................. 455/436, 437, 455/438, 422, 439, 440, 443, 450, 442, 455, 446, 447

(56) References Cited

U.S. PATENT DOCUMENTS

| | | | | |
|---|---|---|---|---|
| 5,101,501 A | * | 3/1992 | Gilhousen et al. ........... 455/442 |
| 5,117,502 A | * | 5/1992 | Onoda et al. ................ 455/437 |
| 5,214,789 A | * | 5/1993 | George ........................ 455/440 |
| 5,260,943 A | * | 11/1993 | Comroe et al. ............. 370/95.1 |
| 5,267,261 A | * | 11/1993 | Blakeney, II et al. ........ 370/332 |
| 5,327,575 A | * | 7/1994 | Menich et al. .............. 455/436 |
| 5,428,816 A | * | 6/1995 | Barnett et al. .............. 455/437 |
| 5,432,843 A | * | 7/1995 | Bonta .......................... 455/438 |
| 5,539,744 A | * | 7/1996 | Chu et al. .................... 370/397 |
| 5,577,022 A | * | 11/1996 | Padovani et al. ........... 370/332 |
| 5,628,052 A | | 5/1997 | DeSantis et al. |
| 5,633,888 A | * | 5/1997 | Stewart ....................... 375/132 |
| 5,640,676 A | * | 6/1997 | Garncarz et al. .......... 455/33.2 |
| 5,649,291 A | * | 7/1997 | Tayloe ......................... 370/332 |
| 5,666,650 A | * | 9/1997 | Turcotte et al. ............. 370/329 |
| 5,711,003 A | * | 1/1998 | Dupuy ........................ 455/436 |
| 5,722,073 A | * | 2/1998 | Wallstedt et al. ........... 455/437 |
| 5,794,149 A | * | 8/1998 | Hoo ............................ 455/436 |
| 5,854,981 A | * | 12/1998 | Wallstedt et al. ........... 455/439 |
| 5,907,807 A | * | 5/1999 | Chavez, Jr. et al. ........ 455/436 |
| 5,918,176 A | * | 6/1999 | Arrington et al. .......... 455/430 |
| 5,936,570 A | * | 8/1999 | Ghazvinian et al. ....... 342/354 |
| 5,940,761 A | * | 8/1999 | Tiedemann, Jr. et al. ... 455/437 |
| 5,953,661 A | * | 9/1999 | Schwinghammer et al. 455/423 |
| 5,970,407 A | * | 10/1999 | Brunner et al. ............ 455/437 |
| 5,995,835 A | * | 11/1999 | De Seze et al. ............ 455/436 |
| 6,018,661 A | * | 1/2000 | Raith et al. ................. 455/437 |
| 6,311,065 B1 | * | 10/2001 | Ushiki et al. ............... 455/440 |

* cited by examiner

*Primary Examiner*—Jean Gelin
(74) *Attorney, Agent, or Firm*—Ryan, Mason & Lewis, LLP

(57) ABSTRACT

An ongoing communication with a mobile in a current cell of a wireless cellular system is handed over to another cell using information regarding a set of potential handover candidates. This information is transmitted from a base station in the current cell or from another fixed part transmitter in the system. The set of handover candidates for a given mobile in the current cell is determined based on stored adjacency information regarding the cells which are adjacent to the current cell. This adjacency information may be stored after an initial system configuration, based on the actual physical layout of the cells, and may be altered during system operation to reflect the success or failure of particular attempted handovers. The set of potential handover candidates may be in the form of a list of beacons associated with the cells adjacent to the current cell, and may include corresponding channel identifying information such as frequency and time slot. The potential handover candidate information may be transmitted upon receipt of a handover assistance request from the mobile, or may be periodically broadcast throughout the system.

28 Claims, 4 Drawing Sheets

ASSISTED HANDOVER IN A WIRELESS
COMMUNICATION SYSTEM

FIELD OF THE INVENTION

The invention relates generally to wireless cellular communication systems and more particularly to techniques for automatic handover of an ongoing mobile communication from one cell to another cell within the system, using information transmitted by the base stations or other fixed part system transmitters.

BACKGROUND OF THE INVENTION

Conventional wireless cellular communication systems include both "outdoor" and "indoor" systems. A typical outdoor system, such as the AMPS wireless cellular telephone system used in the United States, covers a relatively large geographical area. The system uses radio frequency (RF) signals to establish communication between system base stations and mobile radio units or "mobiles." The mobiles are generally free to move throughout a coverage region of the system, while the base stations are in fixed locations, such as on towers positioned throughout the coverage region. Much of the communication in such an outdoor system takes place when the mobiles are located outside of any particular building or other structure. An indoor wireless system, in contrast, is generally set up within a given building, office complex or other structure or set of structures, and utilizes RF signals to support communications between mobiles and fixed base stations located throughout the interior of the structure(s).

A common characteristic of both outdoor and indoor wireless communication systems is the use of coverage cells. Each cell is designed to maintain favorable radio characteristics within its boundary. If a mobile engaged in an ongoing call crosses the boundary of a given cell and moves into another cell, the system must be capable of transferring the ongoing call to the other cell. This process is referred to as "handover," and ideally should be implemented so as to cause substantially no disruption in the ongoing call. Wireless systems also use the handover process to overcome or avoid the effects of system disturbances, such as multi-path fading effects. The handover may be from one time or frequency channel to another, or from one cell to another. In many outdoor systems, such as AMPS, the handover process is centrally controlled and thus almost completely autonomous with respect to the mobile. In contrast, the handover process in many indoor systems, including systems based on standards such as DECT in Europe and PWT in the United States, is completely under the control of the mobile and is therefore based primarily on the mobile's view of the radio spectrum in its own locale.

The radio spectrum environment in an indoor system can be particularly harsh, due to random propagation channel effects such as fading and shadowing. The distances between base stations in an indoor system are therefore generally much smaller than those of outdoor systems. From the perspective of the mobile, many base station signals or "beacons" from other cells can often be detected with excellent signal-to-noise (S/N) ratios at various times and locations as the mobile moves within a given cell. Since the mobile is often in control of any handover actions taken to improve signal quality in an indoor system, the mobile must keep track of all the beacons that it detects, regardless of which cell they originate from, in order to make an intelligent choice from among the available beacons.

The mobile in a system with conventional mobile-controlled handover therefore must examine beacons which may or may not be from "nearest neighbor" or adjacent cells, since it has no way of determining which of the beacons that it detects are from the adjacent cells. Typically, many beacons from both adjacent and non-adjacent cells may be present. For example, it is possible in many indoor environments that a beacon from a non-adjacent cell may momentarily have a sufficient signal strength within the current cell to qualify as a potential handover candidate. An attempted handover to such a candidate will be likely to fail due to changes in multipath or other channel conditions. Even if the attempted handover is successful, changes in channel conditions will tend to necessitate an immediate additional handover. The result in either instance is a slow-down in the overall process of achieving a successful handover, with a corresponding degradation in voice quality. Therefore, despite the fact that many of the beacons that reach a given mobile are not useful in the handover decision, conventional mobile-controlled handover processes require the mobile to consider each beacon in turn in order to weed out the non-useful beacons. This takes time that often results in noticeable degradation of the voice quality in an ongoing call while a handover decision is being made.

A need therefore exists for improved handover techniques that can speed up the handover process, thereby avoiding the handover delays and corresponding degradation in voice quality associated with conventional techniques.

SUMMARY OF THE INVENTION

The invention provides methods and apparatus for implementing assisted handover in a wireless cellular communication system. The invention allows a mobile to maintain substantial control of the handover process, while utilizing cell adjacency information stored in the system infrastructure to provide information regarding the most relevant potential handover candidates for that mobile. The cell adjacency information is used to identify the cells adjacent to the cell in which the mobile is currently located, and the potential handover candidates will correspond to beacons generated by these adjacent cells. This allows the mobile to direct its handover attempts to beacons from adjacent cells, while ignoring beacons from non-adjacent cells. The invention thereby substantially reduces handover-related delays and corresponding voice quality degradation in a mobile-controlled handover process.

In an illustrative embodiment of the invention, when a mobile conducting an ongoing call in a "current" cell determines that a handover to another cell may be needed, the mobile sends a handover assistance request to the base station of the current cell. The base station responds by transmitting to the mobile information regarding a set of potential handover candidates. The potential handover candidates are determined based on stored cell adjacency information which includes identifiers of each of the cells adjacent to the current cell. The adjacency information may be stored in the system base stations after initial system configuration, based on the actual physical layout of the cells, and may be altered during system operation to reflect the continual success or failure of particular attempted handovers.

The information regarding the set of potential handover candidates transmitted to the mobile may be in the form of a list of beacons associated with the cells adjacent to the current cell, and may also include corresponding channel identifying information such as frequency and time slot.

This transmitted information enables the mobile to focus its handover attempts on handover candidates from adjacent cells, and therefore those candidates which are most likely to result in a successful handover. Alternative embodiments of the invention may transmit the potential handover candidate information from a fixed part transmitter other than a system base station, or may periodically broadcast this information throughout the system rather than transmit it upon receipt of a handover assistance request.

DETAILED DESCRIPTION OF THE INVENTION

Figure 1A:
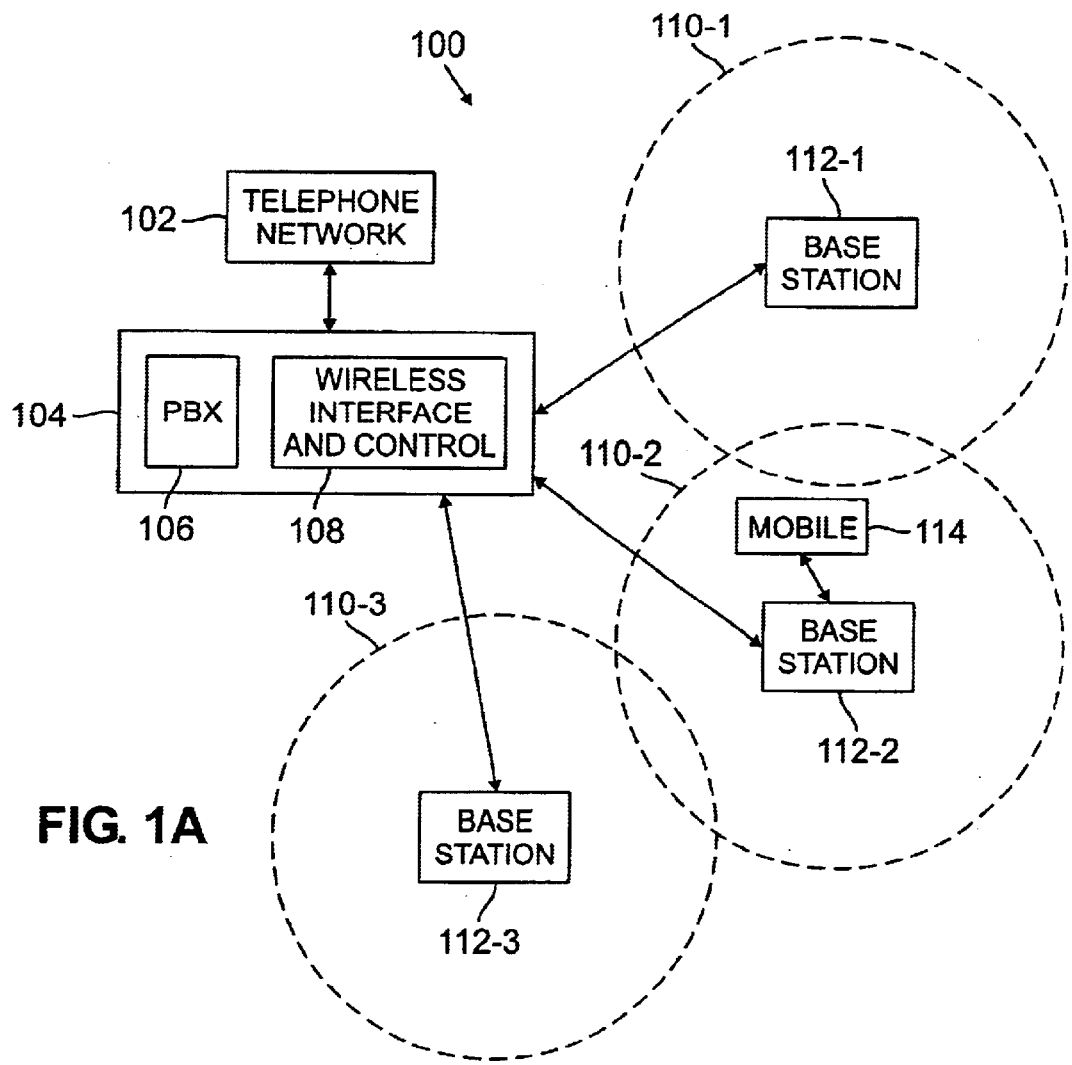
FIG. 1A shows an illustrative embodiment of a wireless communication system in which the assisted handover techniques of the invention may be implemented.

The invention will be illustrated below in conjunction with an exemplary wireless communication system. It should be understood, however, that the invention is more generally applicable to any wireless system in which it is desirable to provide improved handover efficiency. For example, although the disclosed techniques are particularly well-suited for use in an "indoor" wireless system in which cell coverage is generally limited to the building(s) or other structure(s) in which it is installed, the techniques are also applicable to an "outdoor" wireless system or any other type of wireless system. In addition, although described with reference to a time division multiple access/time division duplex (TDMA/TDD) access technique, the invention is also applicable to other access techniques, such as frequency division multiple access (FDMA), code division multiple access (CDMA), frequency division duplex (FDD), space division duplex (SDD), as well as various combinations of these and other access techniques. The term "mobile" as used herein should be understood to include portable telephone handsets, portable computers, portable wireless terminals, personal digital assistants, or any other type of portable system terminal. The term "base station" should be understood to include fixed wireless base stations of indoor wireless systems, outdoor wireless systems, or other types of wireless systems, as well as other types of fixed part transmitters in such systems. References in the description to transmission of cell adjacency information by a base station should be understood to include broadcasts of such information by any type of "fixed part" within a wireless system. The term "beacon" is intended to include a pilot signal or any other type of signal which identifies a particular base station. Additional details regarding exemplary wireless systems suitable for use with the invention may be found in, for example, U.S. Pat. No. 5,628,052 issued May 6, 1997 to DeSantis et al., which is assigned to the assignee of the present application and incorporated by reference herein.

The invention improves efficiency in handover of calls between cells of a wireless cellular system by storing information regarding the physical infrastructure of the system, and utilizing the stored information to provide information regarding the most appropriate handover candidates to the mobiles in the system. In an illustrative embodiment, the invention stores cell adjacency information regarding the system infrastructure in the base stations of the system. The stored adjacency information may include identifiers of the adjacent cells for each of the cells in the system, and is used to facilitate a mobile-controlled handover process. For example, the stored adjacency information can be used to identify the beacons in the cells which are adjacent to a cell in which the mobile is currently located. A list of these beacons can then be communicated to the mobile so that the mobile can monitor only these beacons in anticipation of its next handover. This eliminates the need for the mobile to consider beacons from non-adjacent cells, and thereby substantially reduces the time needed by that mobile to search for another cell for handover.

FIG. 1A shows an exemplary wireless cellular system 100 in which the invention may be implemented. A telephone network 102 is coupled to a switch 104 of the system 100 as shown. The switch 104 includes a private branch exchange (PBX) 106 and a wireless interface and control unit 108. The system 100 also includes a number of cells 110-i, i=1, 2, ... N, each of which includes a corresponding fixed wireless base station 112-i. For simplicity of illustration, only three cells are shown in FIG. 1A, although it should be recognized that the system could include a much larger number of cells. Moreover, the shapes and relative sizes of the cells will generally vary depending on the application. A given cell 110-i may be generally described as an area of coverage for a single omnidirectional antenna or set of directional antennas over which a predefined system performance level has been established. The interface and control unit 108 in switch 104 is connected to each of the base stations 112-i, and directs calls from the base stations to the PBX 106 and vice versa. The base stations 112-i may alternatively be hardwired, via twisted-pair cable or other suitable connection, directly to the PBX 106. The base stations 112-i communicate with mobiles in the cells 110-i to allow the mobiles to place and receive calls over the telephone network 102. FIG. 1A shows base station 112-2 in cell 110-2 communicating with an exemplary mobile 114. As the mobile 114 moves within the cells 110-i of system 100, handovers may occur such that base stations other than base station 112-2 process an ongoing call for the mobile 114. The mobile 114 receives beacons from base stations other than the base station currently processing the call, so as to enable the mobile 114 to determine an appropriate base station for handover.

Figure 1B:
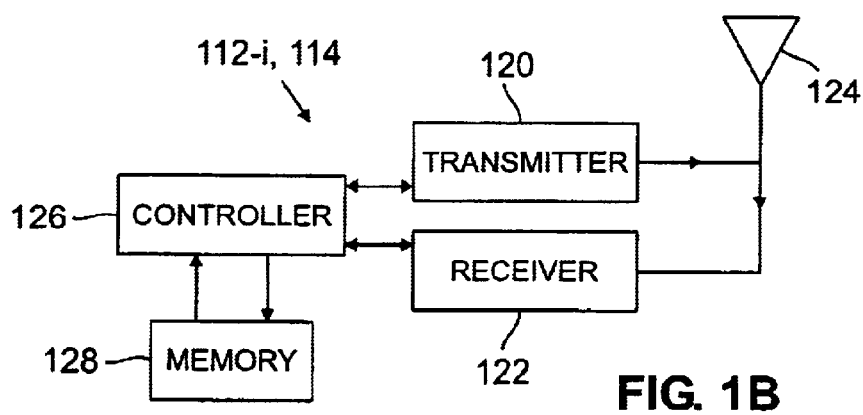
FIG. 1B shows a simplified block diagram of a base station or mobile in the FIG. 1A system.

FIG. 1B is a simplified block diagram of a base station 112-i or mobile 114 within the system 100. Each of the base stations 112-i or mobile 114 may include a transmitter 120 and a receiver 122 which transmit signals and receive signals, respectively, via an antenna 124. The operation of the transmitter 120 and receiver 122 is directed by a controller 126 which operates in conjunction with information stored in a memory 128. The controller 126 may be, for example, a computer, a central processing unit (CPU), a microprocessor, a microcontroller, an application-specific integrated circuit (ASIC) or other type of digital data processor. The memory 128 may represent a random access memory (RAM), read-only memory (ROM) or other electronic memory, a magnetic memory, an optical memory, as well as various combinations of these and other memory devices. The memory 128 may be used to store instructions of one or more software programs which are executed by the controller 126 in order to provide operations such as those to be described in conjunction with FIGS. 2A and 2B below.

It will be assumed for purposes of illustration that in the system 100 of FIG. 1A, the handover process is controlled by the mobile 114. As described previously, in a conventional system with mobile-controlled handover, the mobile generally does not have information about the identity of its adjacent cells. The mobile is therefore required to examine all beacons which it can detect, including those transmitted from non-adjacent cells. The invention solves this problem by transmitting handover candidate information to the mobile based on the cells which are adjacent to the mobile at a particular time. This handover candidate information may be transmitted by the base station in which the mobile is currently located. Alternatively, the handover candidate information may be broadcast periodically throughout all of the cells, and may but need not include the identity of each cell associated with a handover candidate in the broadcast. In an illustrative embodiment, the transmitted handover candidate information includes, for example, identity, frequency, time slot, encoding scheme, and other channel information for each of one or more beacons associated with the cells adjacent to the "current" cell in which the mobile is located. These beacons are associated with the cells adjacent to the current cell, and are therefore the most likely candidates for a successful handover.

Consider as an example a system with a cell layout in which each cell has at most four adjacent cells. Assume the system is a TDMA/TDD system wherein the beacons are frequency-time slot bursts which are generated from each cell. It may be expected as a normal operating mode in a system of this type to have at least one such beacon emitted from each cell. In accordance with one possible broadcast embodiment of the invention, a base station in each cell can broadcast, on the downlink frequency-time slot currently in use, one frequency-time slot location being used in the four cells adjacent to it. Since the cell base stations in this example control the beacons, this adjacent cell information is readily available, and the particular cells need not be identified. The broadcast information contains a message element identifying these frequency-time slot locations and is updated as necessary and sent at regular time intervals consistent with the current state of the beacons. It may be assumed that the mobile is currently on a call with the base station in a current cell and needs this handover candidate information for anticipated handovers. The information can be encoded in a straight-forward manner. In this example, the information may be encoded using four N-bit codes, with each code used to identify the downlink frequency and time slot for one of the four potential handover candidates. A system with 10 frequencies and 12 downlink time slots would require an 8-bit code, with 4 bits used to identify the frequency and 4 bits used to identify the time slot, for each potential handover candidate.

An alternative embodiment of the invention could combine the information described above with information generated by the mobile concerning potential handover candidates. For example, the mobile may measure the received signal strength (RSS) for each of the beacons identified in the handover information transmitted from the base station. The beacon list could then be reduced or rank-ordered based on RSS in order to further reduce the number of potential handover candidates which need to be considered.

As described above, the invention improves handover using stored cell adjacency information regarding the layout of the cells in the system. That information can be stored in an adjacency matrix or other suitable form in a base station memory, such as memory 128 of FIG. 1B. There are many different ways that this information regarding the cell layout can be obtained and updated. For example, physical cell layout information may be entered manually via a computer coupled to the wireless system switch 104 after completion of system installation and configuration. As another example, the adjacency information may be obtained by each of the base stations listening to transmissions from other base stations, with a measure such as average signal strength used to determine the adjacent cells for a given cell. The disadvantage of the latter approach is that the resulting "electromagnetic layout" of the cells may not correspond exactly to the physical layout. Although this approach does not require the physical layout information of the previous approach, it may be used to enhance or supplement such physical layout information.

Another possible approach for obtaining the cell adjacency information is to implement a real-time learning process which allows the wireless interface and control unit 108 of FIG. 1A to monitor the handover preferences of the mobiles as the mobiles move among the cells of the system, and to pass adjacency information to the base station memory 128. In this approach, knowledge of the physical layout again may not be necessary, since the system will learn which cell-to-cell handovers are more successful than others, and will store the details of these successful handovers for future reference. A successful handover can be determined by monitoring, for example, the number of repeat requests made by a mobile, the signal strength improvement resulting from the handover, or the handover request rate of the mobiles in various locations. Without the initial input of the physical cell layout, however, the system will generally need a finite amount of time to obtain the adjacency information. During that time, call quality may be degraded. In fact, some amount of initial call degradation may be a necessary condition for obtaining the most accurate information in such embodiments.

Figure 2A:
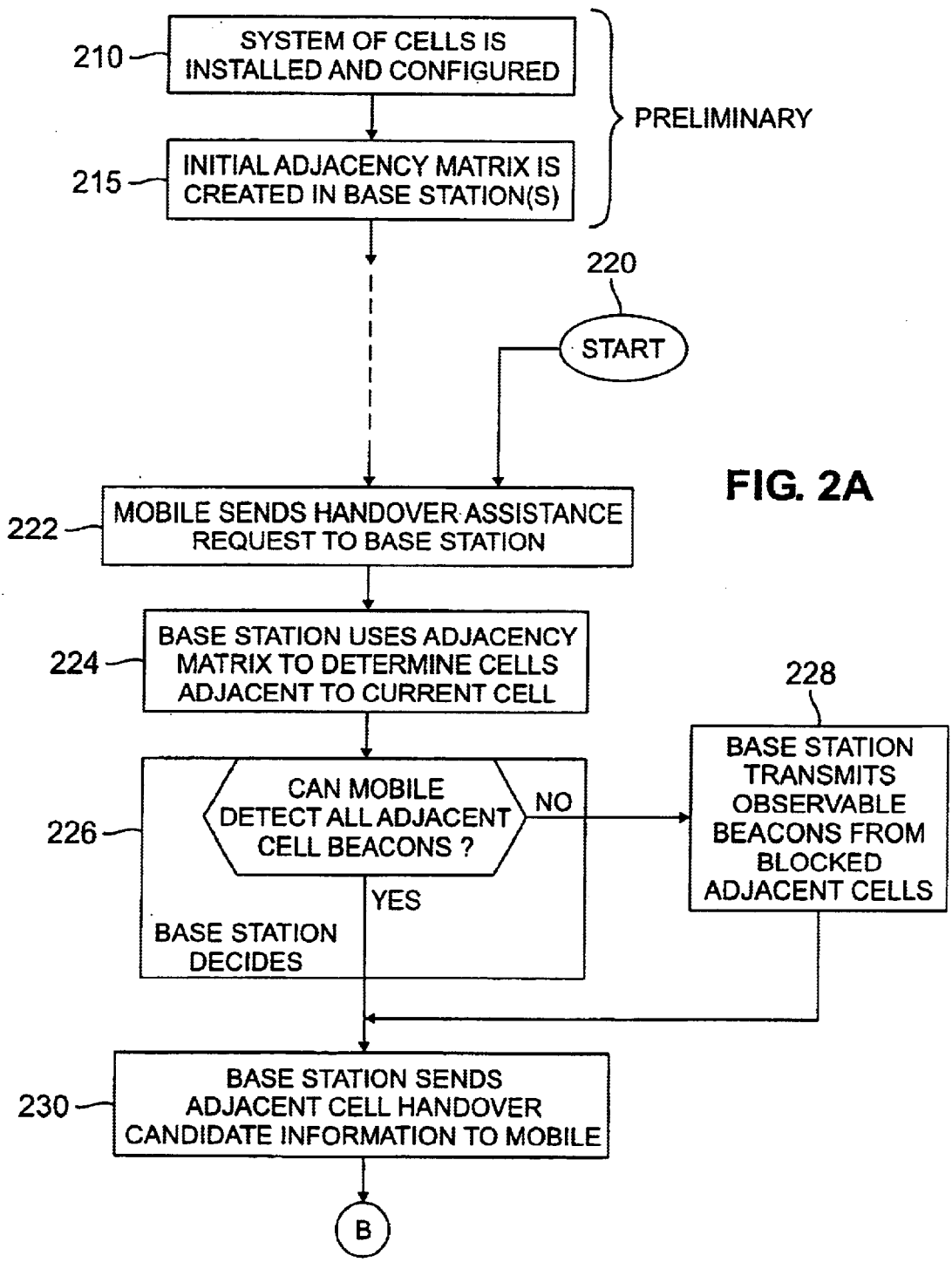
FIGS. 2A and 2B show a flow diagram illustrating an exemplary assisted handover process in accordance with one possible embodiment of the invention.
Figure 2B:
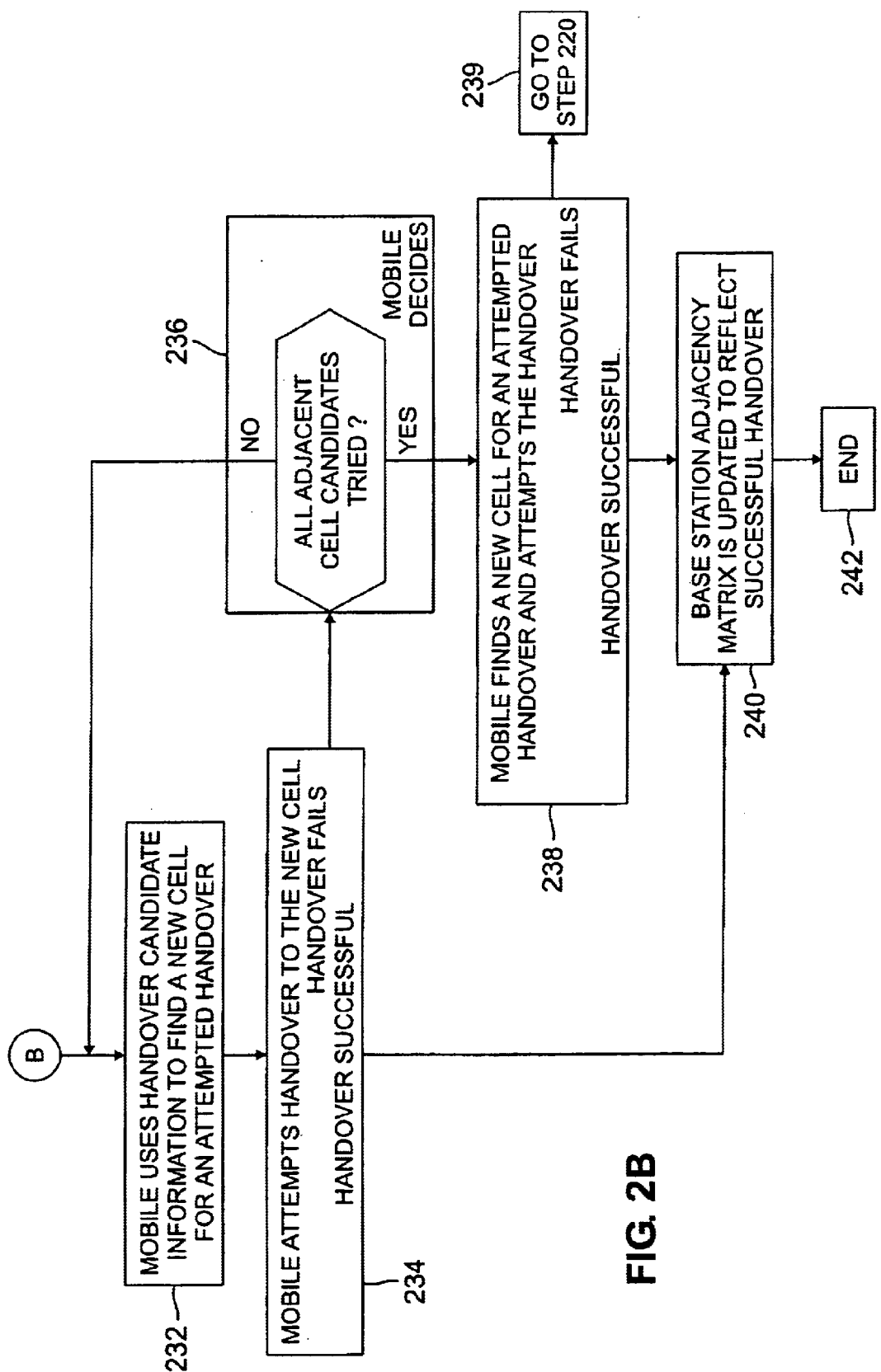

FIGS. 2A and 2B show a flow diagram of an exemplary assisted handover process in accordance with the invention. Steps 210 and 215 of FIG. 2A are preliminary steps which are implemented prior to using the process for any particular handover. In step 210, the system of cells is installed and configured. An initial adjacency matrix is then created in one or more system base stations, as shown in step 215. As described above, the information in the initial adjacency matrix may be simply the physical cell layout as implemented in step 210, or may be obtained through operation of the system over a number of actual handovers. The adjacency matrix may be stored in a memory of each of the base stations. The arrangement of the information in the matrix may be such that reference designators used to locate the adjacency information for a given cell are apparent from the logical location of the information within the memory. The process for a given handover begins in step 222 with a mobile sending a handover assistance request to a base station. This request is generally directed to the base station of the cell with which the mobile is currently communicating, i.e., the base station of the "current" cell. In step 224, the base station receiving the handover assistance request examines the stored adjacency matrix to determine the cell or cells adjacent to the current cell. The base station in step 226 then determines whether the mobile will be able to detect beacons from each of the adjacent cells. If one or more of the adjacent cells are blocked such that the mobile is unable to detect beacons from these cells, the base station in step 228 transmits observable beacons for these blocked cells. The base station in step 230 then sends handover candidate information regarding the beacons for the cells adjacent to the mobile. This handover candidate information may include, for example, frequency and time slot for each of the adjacent cell beacons available to the mobile, and is used by the mobile to limit its search for a handover destination as previously described.

In step 232 of FIG. 2B, the mobile uses the handover candidate information transmitted by the base station to find an adjacent cell for an attempted handover. The mobile in step 234 then attempts a handover to the adjacent cell, using a standard handover procedure. If this procedure is not successful, the mobile repeats steps 232 and 234 for other adjacent cells selected from the handover candidate information, until the handover is successful or all cells suggested in the handover candidate information have been tried. If the mobile in step 236 determines that all the suggested cells have been tried without a successful handover, the mobile will attempt an additional handover procedure on its own as shown in step 238. The additional handover attempt may be to a cell identified by a beacon which is detected by the mobile but is not in a list of beacons in the transmitted handover candidate information. If this additional handover attempt fails, the process returns to step 220 as indicated in step 239. If the additional handover attempt is successful, the system updates the base station's stored adjacency information in step 240 so as to be prepared for the next handover assistance request from the mobile, and the process ends for the current handover assistance request as shown at 242.

Figure 3A:
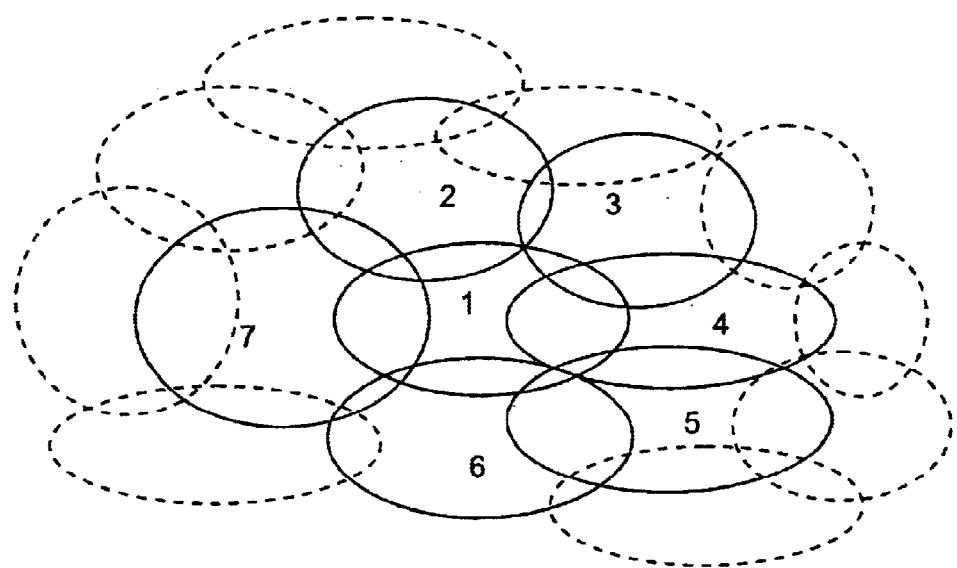
FIGS. 3A and 3B show typical cell layouts for outdoor and indoor wireless cellular systems, respectively.
Figure 3B:
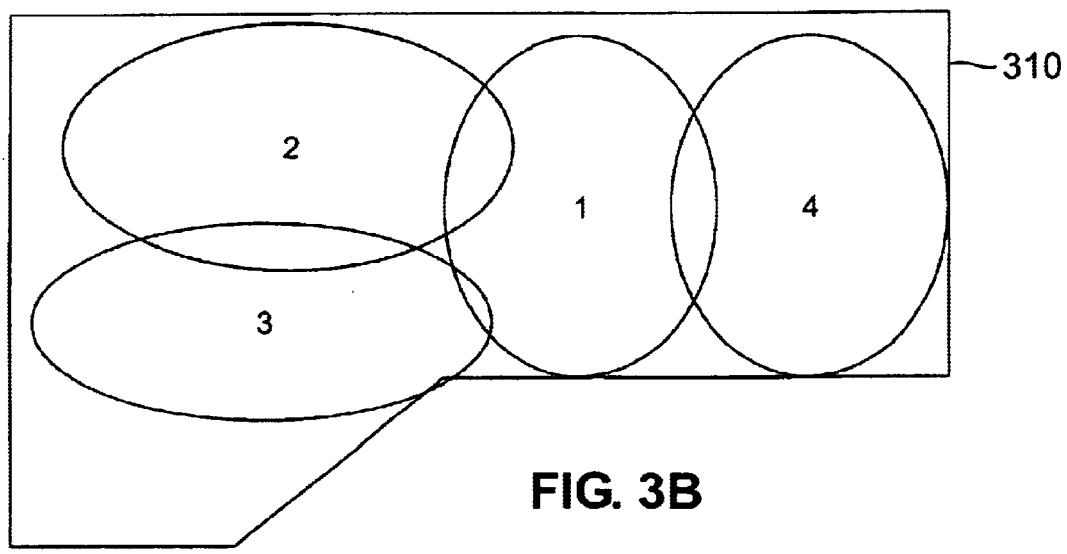

FIGS. 3A and 3B show typical cell layouts for outdoor and indoor wireless cellular systems, respectively, which may utilize the above-described handover process. In the exemplary outdoor system cell layout of FIG. 3A, the cells are arranged in groups of seven cells as shown. This is known as a seven-cell hexagonal layout. A given one of the cells in such a grouping has six adjacent or nearest neighbor cells. For example, the six adjacent cells of cell 1 in FIG. 3A are cells 2, 3, 4, 5, 6 and 7. The cells 2, 3, 4, 5, 6 and 7 each also have six adjacent cells, as indicated by the cells shown in dashed outline in FIG. 3A. The exemplary indoor system cell layout of FIG. 3B includes four cells providing coverage within a building 310. Certain cells in this example have different numbers of adjacent cells. For example, cell 1 has three adjacent cells (i.e., cells 2, 3 and 4), cell 2 has two adjacent cells (i.e., cells 3 and 4), cell 3 also has two adjacent cells (i.e., cells 1 and 2) and cell 4 has only one adjacent cell (i.e., cell 1). A system with the cell layout of FIG. 3B will therefore require communication of less adjacent cell handover candidate information than a system with the layout of FIG. 3A, in which each cell has six adjacent cells. The assisted handover process illustrated in FIGS. 2A and 2B may be implemented in systems with cell layouts such as those shown in FIGS. 3A and 3B, as well as with systems having a wide variety of other types of cell layouts.

It should be noted that another advantage of the invention is that it can help to overcome frequency selection limitations, known as "blind slots," which are inherent in low-cost wireless terminals. Blind slots are frequency or time slots that are inaccessible to the mobile because of tuning delays or limitations in the frequency circuits of the mobile. For example, the time slots adjacent to an active slot (e.g., an active call on a particular frequency and time slot) in a TDMA/TDD system may be inaccessible because the frequency synthesizer of the mobile cannot retune rapidly enough. Inability to access these slots results in lost system capacity. Embodiments of the invention may be configured to keep track of additional information such as mobile operating frequency, time slot and position, such that the handover candidate information sent to mobiles is optimized to account for the presence of blind slots.

The above-described embodiments of the invention are intended to be illustrative only. Numerous alternative embodiments within the scope of the following claims will be apparent to those skilled in the art.

What is claimed is:

1. A method of handing over a communication with a mobile in a current cell to another cell in a wireless communication system, the method comprising the steps of:

transmitting information regarding potential handover candidates to the mobile in the current cell, wherein the potential handover candidates are determined based on stored adjacency information, and further wherein the potential handover candidates associated with the transmitted information are restricted to cells that are contiguous with the current cell and the transmitted information includes frequency and time slot information associated with a beacon, determined to be observable by the mobile, for each of the contiguous cells; and processing an attempted handover to one of the potential handover candidates.

2. The method of claim 1 wherein the transmitting step includes transmitting the information regarding potential handover candidates from a base station in the current cell.

3. The method of claim 1 wherein the transmitting step is carried out in response to a request for handover assistance received in the base station from the mobile.

4. The method of claim 1 wherein the transmitting step includes periodically broadcasting the information regarding potential handover candidates from at least one fixed part transmitter in the system to the mobile.

5. The method of claim 1 wherein the adjacency information is stored in at least one base station of the system in the form of an adjacency matrix which includes, for a given cell, identifiers of all cells contiguous with the given cell.

6. The method of claim 1 wherein the potential handover candidates associated with the transmitted information that are contiguous with the current cell are determined from the original physical layout of the wireless communication system.

7. The method of claim 1 wherein the potential handover candidates associated with the transmitted information that are contiguous with the current cell are determined by a base station in each cell of the wireless communication system.

8. A method of handing over a communication with a mobile in a current cell to another cell in a wireless communication system, the method comprising the steps of:

receiving in the mobile in the current cell transmitted information regarding potential handover candidates, wherein the potential handover candidates are determined based on stored adjacency information, and further wherein the potential handover candidates associated with the transmitted information are restricted to cells that are contiguous with the current cell and the transmitted information includes frequency and time slot information associated with a beacon, determined to be observable by the mobile, for each of the contiguous cells; and initiating in the mobile an attempted handover to one of the potential handover candidates.

9. The method of claim 8 wherein the receiving step includes receiving the transmitted information regarding potential handover candidates from a base station in the current cell.

10. The method of claim 8 wherein the receiving step includes receiving the information regarding potential handover candidates in response to a request for handover assistance transmitted from the mobile to a base station in the current cell.

11. The method of claim 8 wherein the receiving step includes receiving the information regarding potential handover candidates via a periodic broadcast of the information from at least one fixed part transmitter in the system.

12. The method of claim 8 wherein the adjacency information is stored in at least one base station of the system in the form of an adjacency matrix which includes, for a given cell, identifiers of all cells contiguous with the given cell.

13. The method of claim 8 wherein the potential handover candidates associated with the transmitted information that are contiguous with the current cell are determined from the original physical layout of the wireless communication system.

14. The method of claim 8 wherein the potential handover candidates associated with the transmitted information that are contiguous with the current cell are determined by a base station in each cell of the wireless communication system.

15. An apparatus for use in handing over a communication with a mobile in a current cell to another cell in a wireless communication system, the apparatus comprising:

a transmitter for transmitting information regarding potential handover candidates to the mobile in the current cell, wherein the potential handover candidates are determined based on adjacency information, and further wherein the potential handover candidates associated with the transmitted information are restricted to cells that are continuous with the current cell and the transmitted information includes frequency and time slot information associated with a beacon, determined to be observable by the mobile, for each of the contiguous cells; and a memory for storing the adjacency information.

16. The apparatus of claim 15 wherein the transmitter is a base station transmitter in the current cell.

17. The apparatus of claim 15 wherein the transmitter is operative to transmit the information regarding potential handover candidates in response to a request for handover assistance received from the mobile.

18. The apparatus of claim 15 wherein the transmitter is operative to periodically broadcast the information regarding potential handover candidates to the mobile.

19. The apparatus of claim 15 wherein the adjacency information is stored in the memory in the form of an adjacency matrix which includes, for a given cell, identifiers of all cells contiguous with the given cell.

20. The apparatus of claim 15 wherein the potential handover candidates associated with the transmitted information that are contiguous with the current cell are determined from the original physical layout of the wireless communication system.

21. The apparatus of claim 15 wherein the potential handover candidates associated with the transmitted information that are contiguous with the current cell are determined by a base station in each cell of the wireless communication system.

22. An apparatus for use in handing over a communication with a mobile in a current cell to another cell in a wireless communication system, the apparatus comprising:

a receiver in the mobile for receiving transmitted information regarding potential handover candidates, wherein the potential handover candidates are determined based on stored adjacency information, and further wherein the potential handover candidates associated with the transmitted information are restricted to cells that are contiguous with the current cell and the transmitted information includes frequency and time slot information associated with a beacon, determined to be observable by the mobile, for each of the continuous cells; and a controller coupled to the receiver, for initiating in the mobile an attempted handover to one of the potential handover candidates.

23. The apparatus of claim 22 wherein the receiver is operative to receive the transmitted information regarding potential handover candidates from a base station in the current cell.

24. The apparatus of claim 22 wherein the receiver is operative to receive the information regarding potential handover candidates in response to a request for handover assistance transmitted from the mobile to a base station in the current cell.

25. The apparatus of claim 22 wherein the receiver is operative to receive the information regarding potential handover candidates via a periodic broadcast of the information from at least one fixed part transmitter in the system.

26. The apparatus of claim 22 wherein the adjacency information is stored in at least one base station of the system in the form of an adjacency matrix which includes, for a given cell, identifiers of all cells contiguous with the given cell.

27. The apparatus of claim 22 wherein the potential handover candidates associated with the transmitted information that are contiguous with the current cell are determined from the original physical layout of the wireless communication system.

28. The apparatus of claim 22 wherein the potential handover candidates associated with the transmitted information that are contiguous with the current cell are determined by a base station in each cell of the wireless communication system.

* * * * *